United States Patent

[11] 3,552,704

| [72] | Inventor | Robert W. Pond<br>Bethel Park, Pa. |
|---|---|---|
| [21] | Appl. No. | 767,088 |
| [22] | Filed | Oct. 14, 1968 |
| [45] | Patented | Jan. 5, 1971 |
| [73] | Assignee | American Air Filter Company, Inc.<br>a corporation of Delaware. by mesne assignments |

[54] CLAMPING DEVICE FOR SIMULTANEOUSLY SECURING TWO PANELS TO A SUPPORT
3 Claims, 2 Drawing Figs.

[52] U.S. Cl. ............................................... 248/342,
52/464, 85/3, 287/189.36
[51] Int. Cl. .................................................. F16b 21/02
[50] Field of Search ......................................... 248/342;
85/3S, 5.2; 287/20.92J, 189.36D; 52/395, 464, 484, 486, 584

[56] References Cited
UNITED STATES PATENTS

| 1,021,871 | 4/1912 | Kelley ........................ | 52/464 |
| 1,429,018 | 9/1922 | Cibulas ....................... | 52/464 |
| 2,759,439 | 8/1956 | Clements .................... | 52/464 |
| 3,360,910 | 1/1968 | Soltis .......................... | 85/3 |
| 3,430,997 | 4/1969 | Propst et al. ............... | 287/189.36D |

FOREIGN PATENTS

| 906,240 | 9/1962 | Great Britain ............... | 85/5.2 |
| 77,871 | 3/1962 | France ........................ | 52/464 |
| 1,053,166 | 3/1959 | Germany .................... | 52/484 |

*Primary Examiner*— Marion Parsons, Jr.
*Attorney*— Ralph B. Brick

ABSTRACT: A novel clamping device for use in simultaneously securing two panels to a support comprises a bolt and a fastening means. The bolt has a shank with a threaded portion at one end for engaging the fastening means and an enlarged head portion at the other end for engaging the support. The fastening means comprises a nut, a panel engagement member and a biasing means. The nut has a member disposable between the two panels. The panel engagement member is interposed between the two panels and the nut. The biasing means is disposed between the nut and the panel engagement member for urging the panel engagement member away from the nut.

PATENTED JAN 5 1971

3,552,704

INVENTOR.
ROBERT W. POND 3,552,704

CLAMPING DEVICE FOR SIMULTANEOUSLY SECURING TWO PANELS TO A SUPPORT

BACKGROUND OF THE INVENTION

This invention relates to a clamping device for use in simultaneously securing two panels to a support.

In controlled environment rooms, a plurality of panels are situated in a suspended ceiling and supported upon a plurality of supports. Usually, the panel is an air filter whose function is to remove particulate matter from the air entering the room through the filter. A resilient, closed-cell sealing gasket is adhesively bonded to the base of the panel along its perimeter and is adhesively bonded to the support to assure a sealed joint between the panel and the support that, likewise, prevents the particulate matter of the air from entering the room. It is customary to use a plurality of clamping devices to secure the panel to the support; to properly seat the gasket upon the support; and to maintain that sealed joint.

Heretofore, a plurality of simple nut and bolt arrangements was used to secure the panel onto the support. The disadvantages of this simple arrangement were manifest. First, it was not possible to uniformly tighten each simple nut and bolt arrangement to secure the panel evenly along the support. Secondly, it was necessary to tighten the nut and bolt arrangement by working above the suspended ceiling rather than conveniently working beneath the ceiling on its exposed side. The disadvantages of such operations were quite obvious in terms of time and effort.

The present invention uses a novel clamping device which secures two panels to a single support where each individual device is capable of exerting the same force on to the panel, and which may be operated from beneath the suspended ceiling on the exposed side.

SUMMARY OF THE INVENTION

The present invention contemplates a clamping device for use in simultaneously securing two panels to a support. The clamping device comprises a fastening means and a bolt. The bolt passing through an aperture in a support has a shank with a threaded portion at one end for engagement with the fastening means and an enlarged head portion at the other end for engagement with the support. The fastening means which is disposable between the two adjacent panels comprises a C-shaped section, a bar section, and a biasing means. The C-shaped section has an upper arm that is engageable with the threaded portion of the shank and has a lower arm with an aperture therethrough for cooperating with the shank. The bar section has an aperture therethrough for cooperating with the shank and is positioned between the upper and lower arms of the C-shaped section for engagement with the two adjacent panels. A biasing means surrounds the shank and is disposed between the upper arm of the C-shaped section and the bar to bias the bar against the two panels.

For a further understanding of the invention and for the advantages and features thereof, reference may be made to the following descriptions in conjunction with the drawings which show for the purpose of exemplification various embodiments of the invention.

GENERAL DESCRIPTION OF THE DRAWINGS

In the drawings, FIG. 1 is a cross-sectional view illustrating the novel clamping device of the present invention in an engaged position with the two panels; and FIG. 2 is a cross-sectional view of the novel clamping device in a disengaged position suggesting that one of the panels is movable from the support.

DETAILED DESCRIPTION

Figure 1:
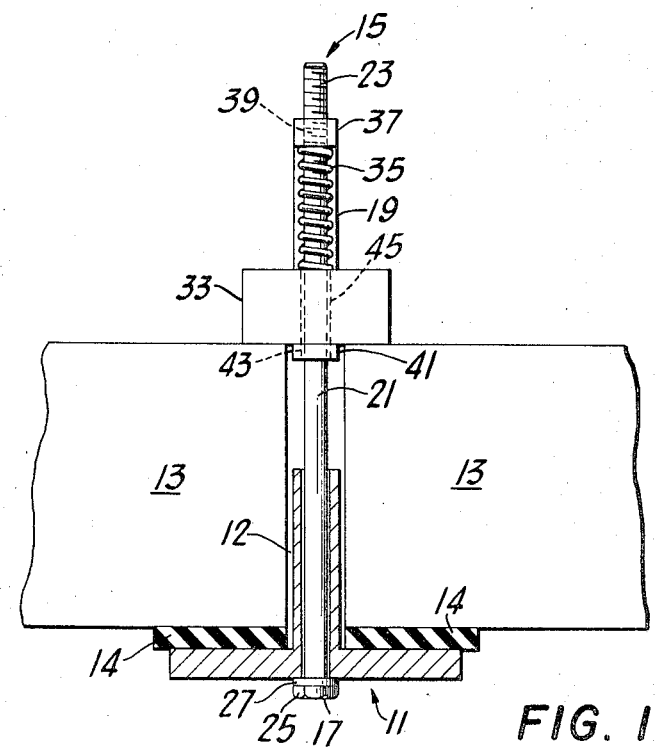

FIG. 1 illustrates the embodiment of this invention with a support 11, two adjacent panels 13 with a resilient sealing gasket 14 bonded to the perimeter of the bottom surface of each panel, a clamping device, generally indicated at 15, which comprises a bolt 17 passing through an aperture 12 in the support 11, and a fastening means 19 which engages the panel 13.

The supports 11 are conventionally a component of a suspended ceiling where hangers or the like suspend the supports 11 from a ceiling and generally intersect each other defining a rectangular gridwork. The present invention, however, may be used either with a suspended ceiling or with a vertical wall comprising the supports 11.

Conventionally, the support 11 has a cross-sectional shape resembling an inverted T, but other shaped supports are satisfactory such as an L-shape. The support 11 has a plurality of apertures 12 disposed at distances along the support for passage of the bolt 17 of the clamping device 15 therethrough.

The panels 13 are generally rectangularly shaped though may be of any configuration and for instance, may be disposed on the supports 11 to form a ceiling. The panels 13 may be air filters of the medium or high efficiency type whose chief function is to remove particulate matter from the air entering the room. Any air filter product which is disposable on the support 11 will suffice for purposes of the invention.

Bonded to the perimeter of the base surface of the panel is a resilient, closed-cell sealing gasket 14 whose function is to provide a sealed joint between the panel 13 and the support 11. The provision for this sealing gasket 14 is optional depending on whether it is desired to exclude particulate matter from the air or not. In some instances, there is no need to provide a sealed joint between the panel 13 and the support 11, in which cases the sealing gasket 14 need not be included.

In accordance with the invention, the clamping device 15 comprises two basic elements, a bolt 17 and a fastening means 19. The bolt 17 has a shank 21 passing through the aperture 12 in the support 11 with a threaded portion 23 at one end of the shank and an enlarged head portion 25 at the other end of the bolt. The threaded portion 23 of the shank 21 is engaged by the fastening means 19, while the enlarged head portion 25 of the shank 21 engages the support 11.

The clamping device 15 may be used in conjunction with controlled environment rooms as mentioned earlier, where a principal function to be accomplished is the exclusion of particulate matter from the air entering the room. Hence, a plurality of sealing gaskets 27 may be interposed between the enlarged head portion 25 of the shank 21 and the support 11 to assure that particulate matter does not leak through the aperture 12 in the support. Where conditions are less critical the sealing gasket-washer 27 need not be used, but it may be desirable to employ a metallic washer.

The fastening means 19 comprises a C-shaped section 31, a bar section 33 and a biasing means 35.

The C-shaped section 31 has an upper arm 37 with an internally threaded portion 39 serving as a nut, which engages the threaded portion 23 of the shank 21. Also the C-shaped section 31 has a lower arm 41 with a smooth walled aperture 43 therethrough, which cooperates with the shank 21, rendering the C-shaped section 31 of the fastening means 19 rotatable about the shank 21. The lower arm 41 or a suitable member is disposable between the two panels 13 to prevent rotation of the fastening means 19 about the bolt 17. The necessity for disposing a member of the fastening means 19 between two adjacent panels 13 will be discussed later.

Figure 2:
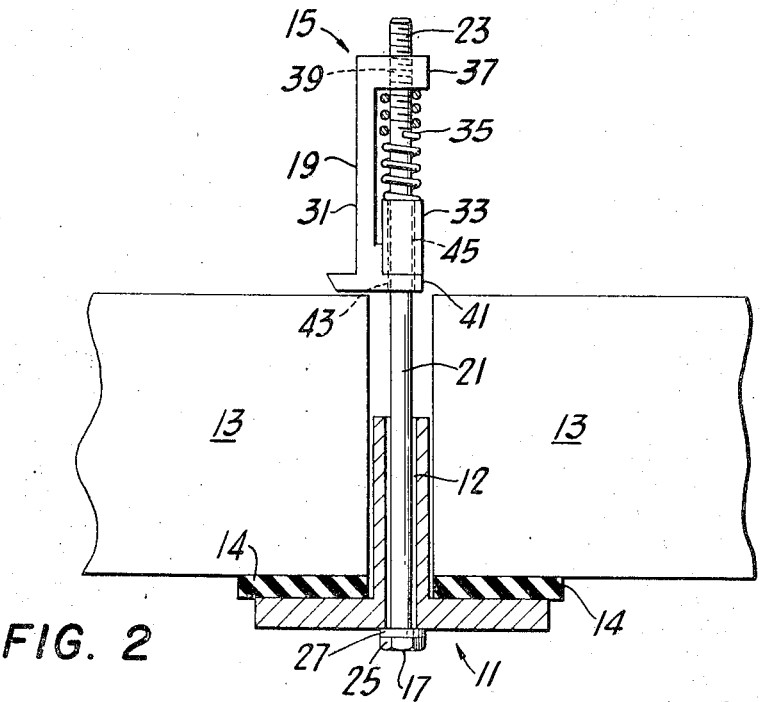

The bar section 33 as shown in FIGS. 1 and 2 is a rectangular member which has an aperture 45 therethrough rendering the bar section 33 rotatable about the shank 21. This bar section 33 being a panel engagement member of the fastening means is positioned on the shank 21 between the upper arm 37 and the lower arm 41 of the C-shaped section 31 and engages the C-shaped section 31 which prevents its rotation about the shank 21. The function of the bar section 33 is to engage the two adjacent panels 13 as shown in FIG. 1 so that when the bar section is biased the panels 13 and the support 11 are urged together by the bar 33.

As shown in FIGS. 1 and 2, the C-shaped section 31 and the bar section 33 of the fastening means are two distinct members for convenience in extruding these parts from aluminum; however, these distinct members could comprise one integral member. Also, the bar section 33 could have other shapes; for instance, an I-shaped member with extended arms normal to the bar section.

The biasing means 35 of this invention comprises a cylindrical, helical compression spring which surrounds the shank 21 and is disposed between the upper arm 37 of the C-shaped section 31 and the bar section 33. The function of the biasing means 35 is to urge with a certain force the bar 33 against the two panels and away from the upper arm 37 of the C-shaped section 31, thereby securing the panels 13 upon the support 11. The biasing means 35 has a certain load capacity in order that each bar 33 of a plurality of clamping devices 15 around the panels will urge the panels 13 against the support 11 with the same force.

In the initial installation of the clamping device 15, it will be necessary to disassemble the respective parts in order to pass the shank 21 through the aperture 12 of the support 11. Once having done this, the other elements may be attached and the clamping device 15 tightened to secure the panels 13 to the support 11; thereafter, it will not be necessary to disassemble the clamping device 15.

As shown in FIGS. 1 and 2, the clamping device 15 is capable of having two different positions with respect to the two panels 13. In one position, the engaging position, as shown in FIG. 1, the lower arm 41 of the C-shaped section 31 is disposed between the two adjacent panels 13 which prevents rotation of the fastening means 19 about the shank 21 so that the clamping device 15 may be tightened or loosened by simply rotating the bolt 17 from beneath the support 11. In addition, the bar section 33 engages the two panels 13. In accordance with this invention, the novel clamping device 15 will also operate when the bar section 33 engages only one panel 13; but from a practical viewpoint, two adjacent panels should be secured with one clamping device. When the enlarged head portion 25 of the bolt 17 is turned the fastening means 19 remains stationary by the lower arm 41 of the C-shaped section engaging the panels 13. Then the upper arm 37 engages the spring 35 which, in turn, engages the bar section 33 to urge the two panels 13 against the support 11. Once the force of the spring 35 approaches the design condition, the bar 33 will not urge the panels 13 with any greater force. Hence, when a plurality of clamping devices 15 are utilized, to secure the panels 13 to the supports 11, the same force will be exerted along the various sections of the panel by the clamping devices 15.

In the other position, the disengaged position as shown in FIG. 2, the fastening means 19 is rotated 90° from the position of FIG. 1 where the fastening means 19 is raised to clear the panels 13 so that the lower arm 41 of the C-shaped section 31 rests on one of the two adjacent panels 13, thereby rendering the other panel 13 movable from the support. The fastening means 19 may conveniently be rotated by merely loosening the bolt in FIG. 1 and rotating the bolt by the enlarged head 25 beneath the suspended ceiling on the exposed side which, in turn, rotates the fastening means 35 to its position in FIG. 2. Once, the panel 13 is removed and replaced with another panel, the fastening means 19 can again be conveniently rotated to its original position as shown in FIG. 1 by merely rotating the enlarged head 25 of the bolt beneath the suspended ceiling on the exposed side. The various elements of the clamping device may be composed of metallic material. In the embodiment shown in FIGS. 1 and 2, the bolt 17 is composed FIGS. aluminum, the C-shaped section of the fastening means 31 and the bar section 33 are composed of extruded aluminum and the tension spring 35 is composed of low carbon steel. The plurality of sealing gaskets 27 may be composed of any suitable sealing material for instance neoprene rubber or the like when it is desirable to seal the aperture 12 in the support.

From this description of the invention, the salient features and advantages of the invention are apparent. First, a novel clamping device is disclosed which is capable of securing two panels to a support. Secondly, with the biasing means, the clamping device exerts a uniform pressure on both panels, a decided advantage. If a plurality of similar clamping devices are utilized, then the pressure on the panels is uniform. Thirdly, except for the initial installation, the clamping device can be conveniently operated by manipulating only the enlarged head of the bolt that is exposed beneath the suspended ceiling.

I claim:

1. A clamping device for use in simultaneously securing two panels to a support comprising:
   a bolt and a fastening means;
   said bolt having a shank disposable through an aperture in the support, with a threaded portion at one end for engaging the fastening means and an enlarged head portion at the other end for engaging the support;
   said fastening means comprising:
      a C-shaped section disposable between the panels having an upper arm engageable with the threaded portion of the shank and a lower arm with an aperture therethrough for cooperating with the shank;
      a bar section having an aperture therethrough for rotatably cooperating with the shank and disposed between the upper and lower arm of the C-shaped section for engagement with two panels; and
      a biasing means surrounding the shank and disposed between the upper arm of the C-shaped section and the bar to bias the bar against the two panels.

2. The clamping device in claim 1 wherein: an annular sealing gasket is disposed around the shank and between the enlarged head portion of the shank and the support to prevent particulate matter from passing through the aperture in the support.

3. The biasing means of claims 1 comprising: a cylindrical, helical compression spring having a maximum load capacity.